United States Patent
Hoffman et al.

(10) Patent No.: US 10,296,870 B1
(45) Date of Patent: May 21, 2019

(54) CARTRIDGE AND SYSTEM FOR AUTOMATED INDUCT OF SINGLE AND MULTIPLE ITEMS INTO AN AUTOMATED PACKAGING MACHINE

(71) Applicant: Amazon Technologies, Inc., Seattle, WA (US)

(72) Inventors: Brian Hoffman, Seattle, WA (US); Martin Peter Aalund, Seattle, WA (US); David Alspaugh, Seattle, WA (US); Samuel Gardner Garrett, Seattle, WA (US); Paul Roy Raines, Jr., Seattle, WA (US); Timothy Alan Talda, Seattle, WA (US); Akshay Tilekar, Seattle, WA (US); Stephanie Tomasetta, Seattle, WA (US); Eric Wyman, Auburn, WA (US); Toby Ge Xu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/653,313

(22) Filed: Jul. 18, 2017

(51) Int. Cl.
*G06Q 10/08* (2012.01)
*B65D 81/05* (2006.01)

(52) U.S. Cl.
CPC .......... *G06Q 10/087* (2013.01); *B65D 81/05* (2013.01)

(58) Field of Classification Search
CPC ..................................... G06Q 10/087
USPC ......................................... 235/385
See application file for complete search history.

(56) References Cited

U.S. PATENT DOCUMENTS

| | | | |
|---|---|---|---|
| 2002/0121073 A1* | 9/2002 | McGrane | B65B 43/30 53/459 |
| 2008/0121537 A1* | 5/2008 | Sankaran | B65B 5/045 206/223 |
| 2011/0023421 A1* | 2/2011 | Izquierdo | B65B 9/045 53/477 |
| 2014/0196408 A1* | 7/2014 | Murray | B65B 25/065 53/447 |
| 2014/0237948 A1* | 8/2014 | Finkowski | B65B 47/10 53/467 |
| 2017/0253422 A1* | 9/2017 | Anklam | B29C 66/0044 |

* cited by examiner

*Primary Examiner* — Allyson N Trail
(74) *Attorney, Agent, or Firm* — Baker & Hostetler LLP

(57) ABSTRACT

A packaging system employs a cartridge having moveable walls such that the cartridge discharges or inducts one or more items into a cavity of a package, such as a film that is sealed into a pouch or mailer. A bottom wall of the cartridge is retracted relative to an end panel of the cartridge during the induction process.

20 Claims, 4 Drawing Sheets

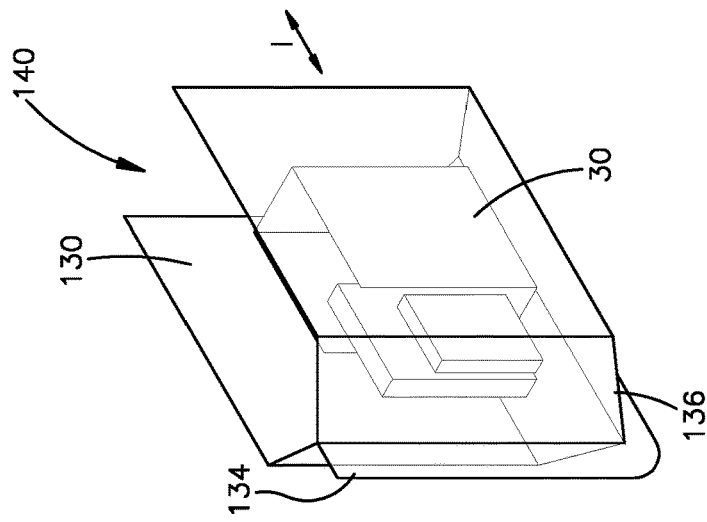
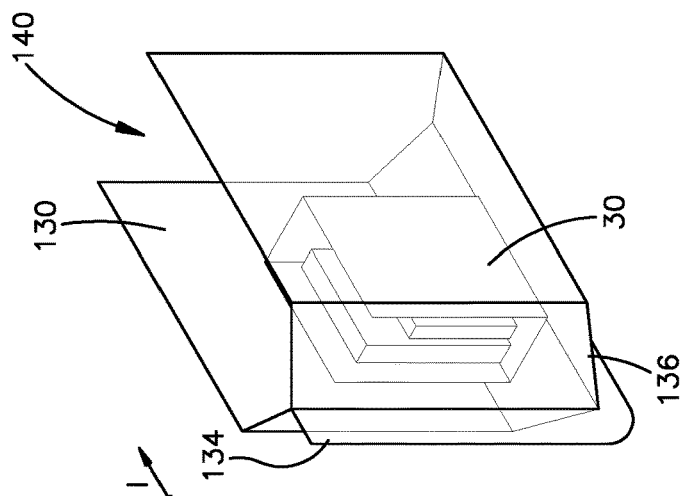
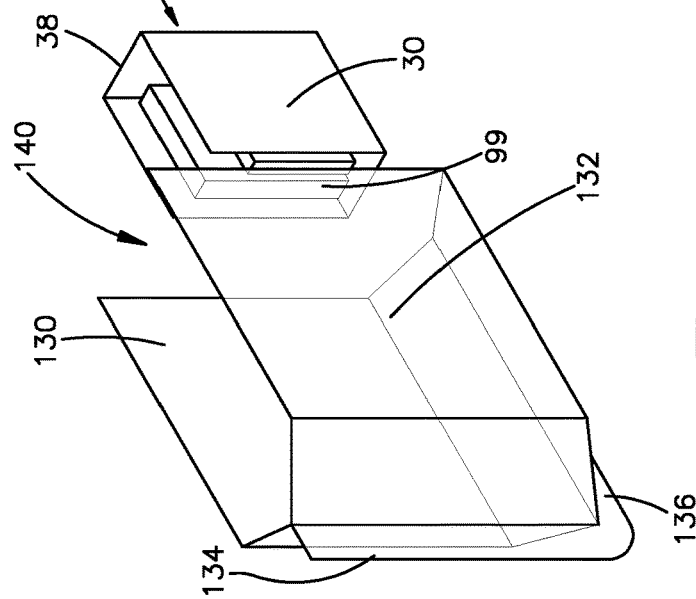

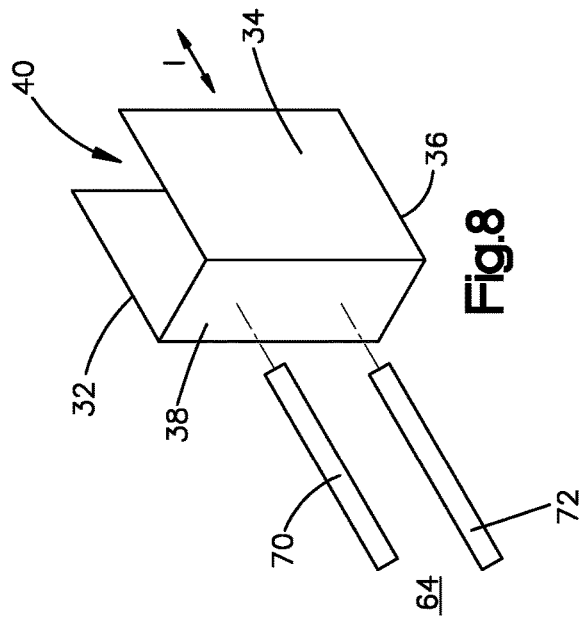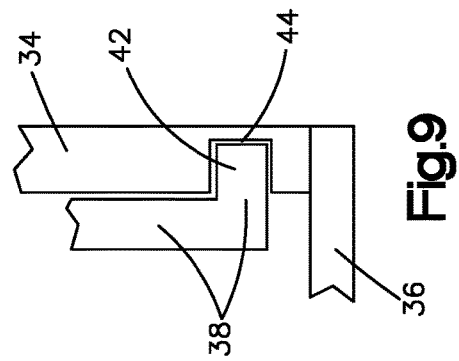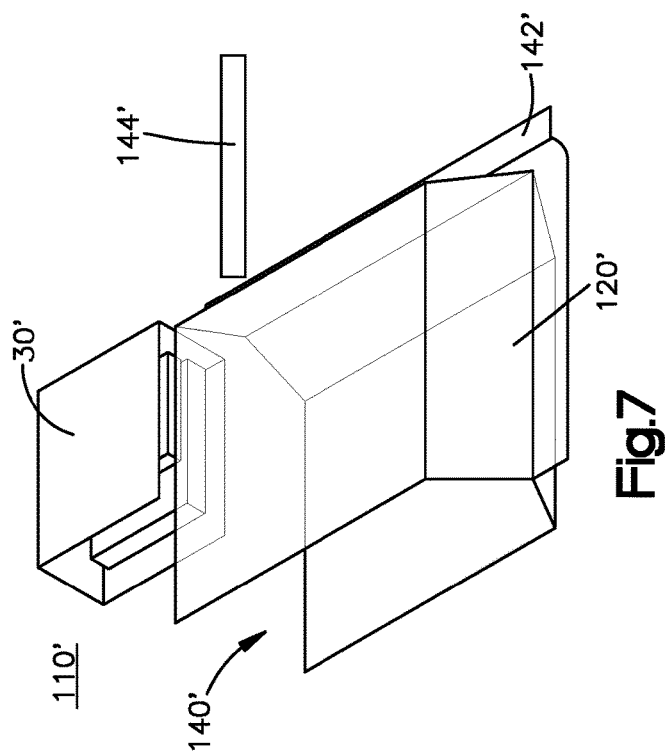

CARTRIDGE AND SYSTEM FOR AUTOMATED INDUCT OF SINGLE AND MULTIPLE ITEMS INTO AN AUTOMATED PACKAGING MACHINE

BACKGROUND

Packaging of items into mailers or pouches is performed in vast quantities. For just one example, some conventional, commercial packaging machines receive a web from a roll of film, feed it downwardly, and fold the web along its vertical center to form a pair of opposing sidewalls. A horizontal sealing jaw forms a bottom seam. The vertical sidewalls and bottom seam form part of a cavity for receiving one or more items for packaging. Typically, a person inserts the one or more items, along with whatever identifying or packaging information is appropriate, into the cavity. Conventional packaging machines typically have a light curtain such that a control system locks out the machine until the person's hands are clear from the machine.

Then, a servo motor of the machine advances the web a predetermined distance below the horizontal jaws. A pair of vertical front-sealing jaws engage the front edges of the web sidewalls and the horizontal sealing jaw engages the top edges, across the sidewalls from the front edges to fold at the rear. Thus, the remaining two sides of the film are sealed to form a pouch. The horizontal jaw also cuts the film to free the pouch from the web, and the sealed package falls into a bin for further processing, packaging, and/or shipping.

Depending on the desired function, the web preferably is a multiplayer blend of co-extruded polyethylene film. For example, if the pouch is a mailer, the web may be a polyethylene film lined on the inside with bubble wrap, such as a 7/64" bubble film. If the pouch is intended to be packaged inside another container, such as a box, then the web can be one or my plies of a film of any desired polymer.

BRIEF DESCRIPTION OF THE FIGURES

FIG. 2 is a perspective view of a portion of the packaging system of FIG. 1 with portions removed for clarity, showing a cartridge loaded with items ready to induct the items into a cavity formed by the web of film;

FIG. 3 is a view of the system of FIG. 2 with the cartridge inducted into the cavity;

FIG. 4 is a view of the system of FIG. 3 with the items partially discharged from the cartridge;

FIG. 7 is a partially schematic view illustrating another embodiment of the system in which the web of film moves approximately horizontally;

FIG. 8 is a schematic view of the arm assembly and a view of the parts of the cartridge; and FIG. 9 is a schematic view of portions of the cartridge.

DETAILED DESCRIPTION OF PREFERRED EMBODIMENTS

Figure 1:
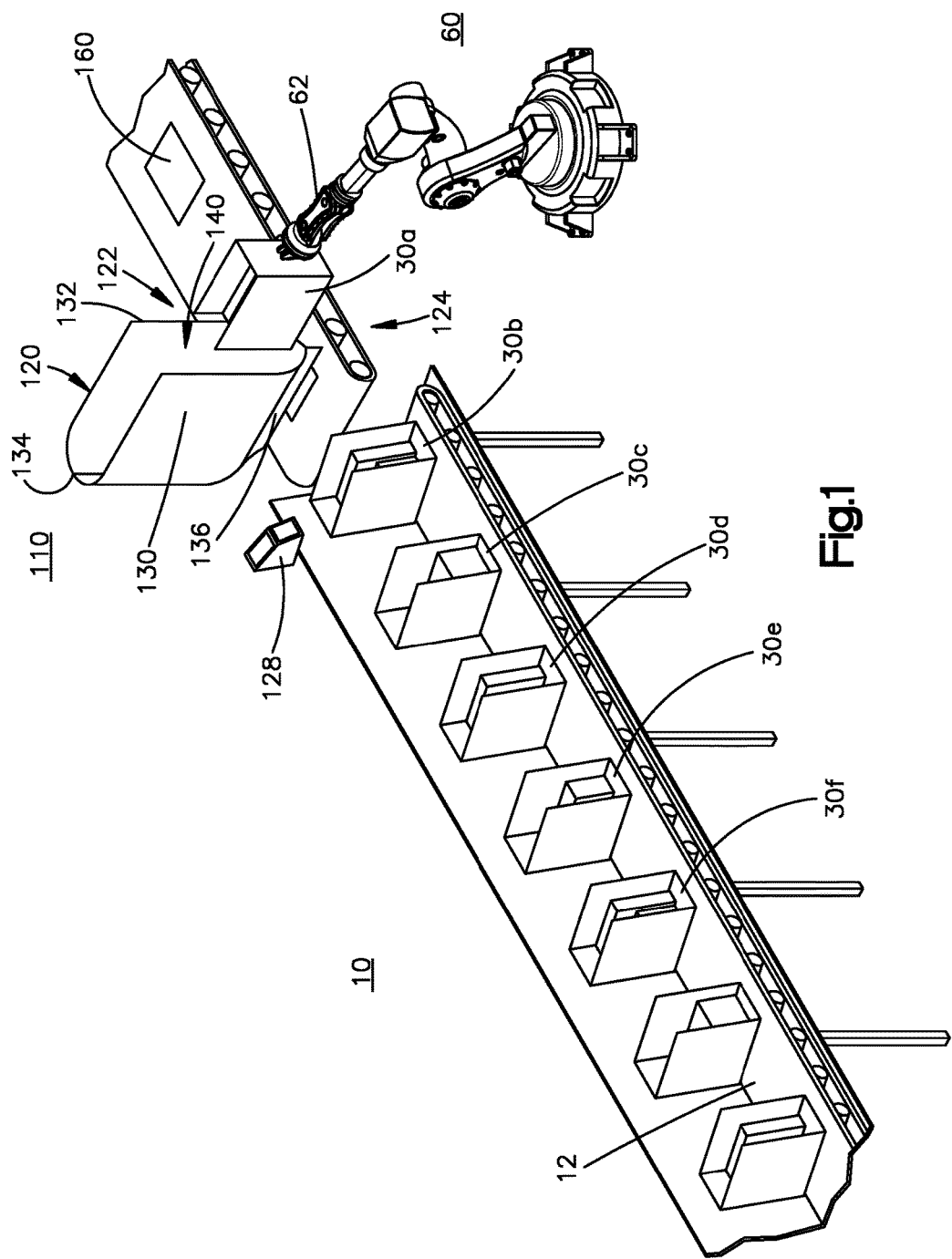
FIG. 1 is a perspective, partially schematic view of a packaging system illustrating aspects of a first embodiment.

The present invention relates to a packaging system that employs a cartridge having moveable walls such that the cartridge discharges or inducts one or more items into a package, such as a film that is sealed into a pouch or mailer. In a modern fulfillment center or like packaging handing facility, a vast quantity of items are sorted, transported, tracked, and inducted into packages, such as boxes or pouches. Further, the items encompass a great number of sizes and shapes (such as cuboid, cylindrical, and/or spherical packages or products) in various quantities and combinations.

According to a first aspect of a first embodiment of the system is capable of reliably handling items at commercial speed, a packaging system for inducting and packaging items includes a film that moves horizontally or vertically and a cartridge that is insertable into a cavity formed by the film. In this regard, the term "cavity" is used herein to include any receptacle regardless of its structure and materials, unless expressly set out in the claim. For example, the description includes details of a particular flexible film that forms one type of cavity as part of a specific process for forming a pouch. The term "cavity" also includes a rigid structure, such as a bin, tote, pod, paperboard box, and the like; other flexible film structures, such as an open-top bag of any configuration; a pouch of any configuration, such as a pouch on an assembly of pouches in a conventional pouch sorter, which pouch can be formed of a film, fabric, or other material; and the like. Referring again to a specific embodiment, after induction of the one or more items into the cavity, the film indexes from an infeed position to an outfeed position where it is sealed by jaws to form a sealed package and simultaneously creates a new cavity at the infeed position.

As described more fully below, induction is achieved by inserting the cartridge, which carries the items, into a cavity. The cartridge has an open face, and preferably has a pair of sidewalls, a bottom wall, and an end panel that is moveable relative at least the bottom wall, and optionally also the sidewalls. The end panel is held approximately stationary (that is, approximately stationary relative to the cavity), while the bottom wall and optionally the bottom wall and sidewalls are retracted. Alternatively, the end panel wall may be moving in space (that is, relative to the cavity and/or the environment) while the bottom wall (or the bottom wall and sidewall assembly) is being retracted. For example, the end panel may be moving inwardly into the cavity (that is, in the direction of insertion) while the bottom wall is being retracted, which for some configurations of cartridges and for some items may be beneficial in more forcefully ejecting or discharging items from the cartridge and/or in diminishing the cycling speed (that is, the time interval of the insertion and retraction of the cartridge). Also, the end panel may be retracted or moving outwardly from the cavity while the bottom wall (or the bottom wall and sidewall assembly) is being retracted, such that bottom wall is retracted relative to the end panel. That is, both the bottom wall and the end panel can be retracted together with the bottom wall being retracted at a higher speed than the retraction of the end wall, which for some configurations of cartridges and for some items may be beneficial in more gently ejecting or discharging items from the cartridge and/or in diminishing the cycling speed (that is, the time interval of the insertion and retraction of the cartridge). After the items are discharged from the cartridge, the entire cartridge is removed from the cavity, and the cavity is seamed and released from the machine.

Referring to the figures to describe a first embodiment, a packaging system 10 includes a conveyor 12, a cartridge 30, an automated cartridge handling system 60 for handling the cartridges 30, and a jacket or pouch forming machine 110. Cartridge 30 houses one or more items 99 until they are inducted and sealed into a pouch 160. The term pouch is used broadly to refer to a mailer or jacket or any shape or size that holds items 99.

Conveyor 12 can be any type for transporting cartridges 30. As explained more fully below, the cartridge 30 preferably has an open face, thus conveyor 12 may include two sides 14 and 16 to carry the cartridges in a tilted position such that items in the cartridges are inhibited from falling out of the front face by gravity. A labeler 128 located proximate to conveyor 12 may insert packaging information into cartridge 30 identifying the items 99 therein. Labeler 128 is part of a larger control system that tracks items 99 and/or cartridges 30 to assure that the appropriate items are placed into an appropriate pouch 160, which pouch can be labeled with customer information or other information important to processing. The present invention is not limited to any type or configuration of conveyor or control system, as any type of conveyor (preferably conventional) or control system may be employed, as will be understood by persons familiar with conveyor technology.

Cartridge 30 preferably has a cuboid or rectangular shape. Cartridge 30 includes a pair of upstanding, parallel sidewall 32 and 34 that are spaced apart, a floor or bottom wall 36 that extends between sidewalls 32 and 34 at or near the lower ends of sidewalls 32,34, and an end panel 38. In a first embodiment of cartridge 30, end panel 38 is movable relative to both bottom wall 36 and to sidewalls 32,34. Preferably, a front end of cartridge 30 is open, as illustrated by front face 40, and its top is open for ease of loading items into cartridge 30.

For example, FIG. 9 shows a schematic representation of sidewall 34 affixed to bottom wall 36. Preferably, in the embodiment of FIG. 9, sidewall 32 would also be affixed to bottom wall 36 such that sidewalls 32 and 34 and bottom wall 36 form, in end view or cross section perpendicular to an induction axis I, a U-shape, or in three dimensions an open ended trough. Axis I reflects the direction of the cartridge insertion and retraction. Panel 38 has the shape (in end view perpendicular to axis I) that is the same as that formed by the trough 32, 34, 36, as end panel 38 is configured to move relative to the trough. Further, panel 38 has the approximate dimensions of the trough but for clearance to enable the movement consistent with the function of cartridge 30. The present invention is not limited to any cross sectional or other shape or configuration of cartridge unless expressly set out in the claims.

End panel 38 is configured to move within the trough formed by walls 32, 34, and 36 by any means. For example, FIG. 9 schematically illustrates that end panel 38 includes a runner 42 that extends outwardly from one lower end of panel 38 and that protrudes outwardly (that is, perpendicular to axis I and extending as a horizontal protrusion relative to the rectangular shape of panel 38) to extend into a channel or groove 44 formed in side wall 34. Preferably, runner 42 and groove 44 extend the full length (parallel to axis I) of cartridge 30, although stops may be employed. Preferably, an identical runner and groove system 42,44 are configured on the side opposing that shown in FIG. 9 such that side panel 32 also receives a groove to mat with a corresponding runner. Moreover, depending on the particular configuration chosen, a runner and groove system may also be located near an upper end of the body of panel 38, such that a runner extends outwardly from panel 38 at all four corners of its rectangular shape. The present invention is not limited to any structure or configuration of panel 38, but rather the invention encompasses any structure and configuration that achieves the structure and function defined in the claims.

An automated cartridge handling system or robot 60 is located at or near the discharge end 18 of conveyor 12. Handler 60 includes an arm 62 that includes a mechanism 64 for grasping and manipulating cartridge 30. In use, arm 62 can grasp cartridge 30, such as by a claw that grasps the cartridge or forks that fit into receptacles on the cartridge (not shown in the figures), or any other structures for enabling cartridge 30 to be grasped and moved, as will be understood by persons familiar with automated handling mechanisms. Arm 62 includes a pair of actuators 70 and 72, as explained more fully below. As illustrated in FIG. 1, arm 62 grasps cartridge 30 from conveyor 18. In the orientation of FIG. 1, arm 62 grasps cartridge 30 and rotates it into position for induction shown in FIGS. 1 through 8. Alternatively, cartridge 30 may be upright on the conveyor such that arm 62 grasps cartridge 30 from the back (that is, opposite open front face 40). Arm 62 can grasp cartridge 30 at any location on the cartridge consistent with the structure and function of the cartridge. FIG. 8 schematically illustrates actuators 70 and 72 for manipulating cartridge 30. While arm 62 is engaged with cartridge 30, actuator 70 is connected to end panel 38 and actuator 72 is connected to at least bottom wall 36. In the configuration in which end wall 36 is affixed to sidewalls 32 and 34, actuator 72 may be affixed to any or all of walls 32, 34, and 36.

FIGS. 2 through 6 illustrates a infeed portion 122 of a web 120 of film for forming a pouch 160, which pouch is produced from the film by a pouch forming machine 110, such as (but not limited to) machinery supplied by PAC Worldwide as PACjacket machines. The present invention is not limited to any particular machine, process, or configuration unless expressly stated in the claims. Preferably, the film making up the web is a co-extruded polyethylene; but any film suitable for holding items 99 may be employed, according to the particular parameters of the application. Conventional bubble film may be employed or any other material or structure intended to hold items 99 therein.

FIG. 2 illustrates web 120 already folded to form opposing sidewalls 130 and 132 that are formed by the action of machine 110 by folding web 120 at a fold 134. As shown in the figures, machine 110 has formed a bottom seam 136 by the operation of a pair of opposing horizontal sealing jaws 142, as will be understood by persons familiar with commercial packaging machinery in view of this specification. Sidewall 130 is spaced apart from sidewall 132 horizontally and perpendicular to axis I such that sidewalls 130 and 132, fold 134, and bottom seam 136 form a cavity 140 therebetween. FIG. 2 shows cartridge 30 loaded with items 99 and in its ready position outside of cavity 140, controlled by arm 62 (not shown in FIGS. 2 through 7 for clarity).

Figure 5:
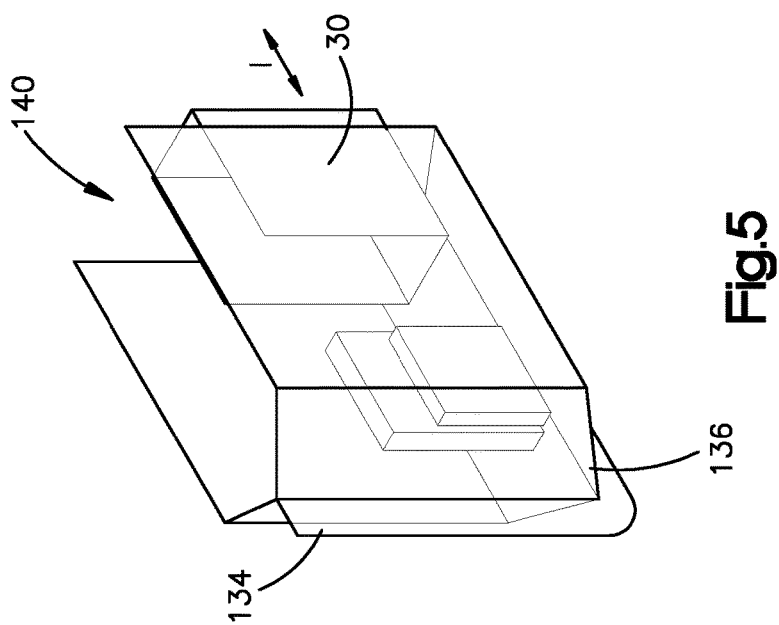
FIG. 5 is a view of the system of FIG. 3 with the items fully discharged from the cartridge and the cartridge located in the cavity.

FIG. 3 illustrates cartridge 30 inserted into cavity 140 by arm 62, with cartridge 30 in its ready or unactuated state, with both actuators 70 and 72 in their extended positions. FIGS. 4 and 5 illustrate the actuation sequence of the process of discharging items 99 from cartridge 30 into cavity 140. With cartridge 30 located in cavity 140, actuator 72 retracts at least bottom wall 36, and in the embodiment in which they are affixed together, actuator 72 retracts bottom wall 36 and sidewalls 32 and 34 as a unit, while actuator 70 holds end panel 38 in an extended position. When bottom wall 36 retracts sufficiently relative to end panel 38, items 99 fall into or are placed on the web forming cavity 140.

Figure 6:
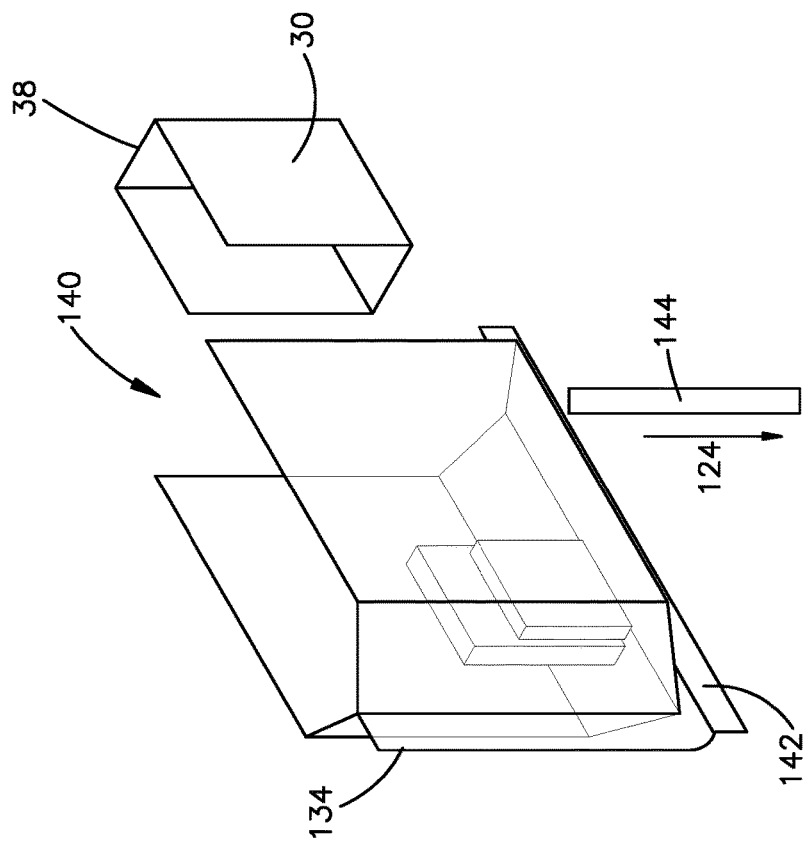
FIG. 6 is a view of the system of FIG. 3 with the items inducted into the cavity and the cartridge retracted from the cartridge.

Upon cartridge 30 being fully inserted into cavity 140, end panel 38 preferably is fixed in space for the entire period of the retraction of bottom wall 36, or retraction of the combination of bottom wall 36 and sidewalls 32 and 34. Alternatively, as explained above, the present invention encompasses end panel 38 moving in the insertion direction and/or the retraction direction for a least a portion of the period during which bottom wall 36, or the combination of bottom wall 36 and sidewalls 32 and 34, is retracted. Referring to FIG. 6, upon discharging items 99, actuator 70 retracts panel 38 or arm 62 retracts cartridge 30. With cartridge empty of items 99, the induction sequence for the particular items and cartridge (30*a*) is complete.

As illustrated in FIG. 1, a series of cartridges 30*b*, 30*c* et seq. are conveyed to the cartridge handler 60 while arm 62 is controlling the item induction process of first cartridge 30*a*. After an induction process, shown completed in FIG. 6, for the items 99 in cartridge 30*a*, cartridge handler 60 disengages with the cartridge 30*a* and then grasps the next cartridge 30*b* for induction of the items 99 in cartridge 30*b*, and the induction cycle repeats. The inventors contemplate that the system optionally includes sensors to determine that the items have been successfully inducted into cavity 140.

After items 99 are inducted into cavity 99 by discharging items from a cartridge 30, machine 110 opens a pair of opposing horizontal jaws 142 and indexes web 120 downwardly past the jaws by a predetermined or controlled distance into outfeed area 124, after which indexing a pair of opposing vertical jaws 144 close to capture the open, front edges (that is, edges opposite fold 134) to form a seam. Horizontal jaws 142 also close to form a top seam of pouch 160 (as the cavity 140 has been moved from infeed portion 122 to outfeed portion 124), and thus enclose the web for sealing around all edges of pouch 160, which is then cut off from the web 120. The closing of horizontal jaws 142 also forms bottom seam 136, to partially form cavity 140 on the infeed side 122 of the web. Jaws 142 and 144 may seal and form seams from the film of web 120 by any means, such as by applying heat or ultrasonic energy, depending on the material of the film, the desired package produced, and other packaging parameters well understood by persons familiar with package seaming technology.

FIG. 7 illustrates an alternative configuration of a packaging machine 110' in which a web 120' is moved horizontally (to the right as oriented in FIG. 7). Cartridge 30' is actuated, and the induction process of items 99 into cavity 140' is the same as described for first machine embodiment 110 and cartridge 30, except vertical jaws 144 are replaced by a pair of horizontal jaws 144' to seam the front edges of the web 120'. Moreover, the present invention encompasses configurations in which the web moves in a direction that is offset from a vertical axis, as well as offset from a horizontal axis. In this regard, no claim of the present invention is limited to orientation (that is, vertical, horizontal, or angled therebetween relative to any axis) of the web of film as it moves through the induction process unless the orientation is expressly stated in the claim.

The present inventions are described by employing specific embodiments, orientations, and configurations of a packaging machine, conveyor, cartridge, cartridge handling machine, and pouch. The present invention is not intended to be limited to any specific structure, function, or goal of any or all of the specific embodiments, orientations, and configurations described herein. Rather, it is intended that the invention be given the full scope as stated in the claims. Further, aspects of the structure and function is shown schematically in some places. It is understood that persons familiar with the underlying technology in view of the present disclosure will understand and be capable of implementing the structures and functions of the technology shown schematically herein. A specific machine is discussed in the Background section of the specification merely to illustrate one conventional means for inducting items into a cavity. As is clear from the specification, the present invention is not limited to the solution of any particular problems stated in or inferred from the Background section, nor to any improvements to the structure and function of the machinery or methods described in the Background section. Further, the present invention is not limited to any particular structure or material of the cavity, as explained above. Rather, the inventors intend that the present invention be employed in any environment and that the scope of the invention be defined by the plain meaning of the claims.

What is claimed is:

1. A packaging system for inducting and packaging items, comprising:
   a film including a pair of vertical sidewalls, a rear fold, and a bottom seam, the film sidewalls and bottom seam at least partially forming a cavity for receiving one or more items; and
   a cartridge including a pair of opposing sidewalls, a floor, an end panel, and an open front face; the cartridge being configured to be moveable relative to the cavity such that the cartridge is insertable into the cavity and then retractable from the cavity;
   the end panel of the cartridge being configured to be moveable relative to the cartridge floor and the cartridge sidewalls such that during retracting of the cartridge from the cavity, the cartridge floor retracts relative to the cartridge end panel, whereby the one or more items are discharged from the cartridge into the cavity.

2. The packaging system of claim 1 further comprising vertical jaws adapted for sealing front edges of the film sidewalls together and horizontal jaws adapted for forming the film bottom seam, wherein the vertical jaws engage the front edges of the film sidewalls and the horizontal jaws engage the sidewalls to enclose the cavity upon indexing of the film to an outfeed position.

3. The packaging system of claim 1 wherein the at least one cartridge sidewall is a pair of opposing cartridge sidewalls that are affixed to the cartridge floor, such that the cartridge sidewalls and the cartridge floor are adapted to retract together relative to the end panel, whereby the one or more items are discharged from the cartridge into the cavity.

4. The packaging system of claim 1 wherein the at least one cartridge sidewall is a pair of opposing cartridge sidewalls that are affixed to the cartridge end panel, such that the cartridge floor is adapted to retract relative to the cartridge end panel and cartridge sidewall, whereby the one or more items are discharged from the cartridge into the cavity.

5. The packaging system of claim 1 wherein the system is configured such that for a least a portion of a time period while at least the floor is being retracted, the cartridge end panel is stationary in space.

6. The packaging system of claim 1 wherein the at least one cartridge sidewall is a pair of opposing cartridge sidewalls that are affixed to the cartridge end panel, such that the cartridge bottom wall is adapted to retract relative to the cartridge end panel and cartridge sidewall, whereby the one or more items are discharged from the cartridge into the cavity.

7. A packaging system for inducting and packaging items, comprising:

a film including a pair of walls and a rear connection between the walls, the walls being spaced apart to at least partially form a cavity for receiving one or more items; and a cartridge including at least one sidewall, a floor, and an end panel; the cartridge being configured to be moveable relative to the cavity such that the cartridge is insertable into the cavity and then retractable from the cavity;

the cartridge floor being adapted for having an item rest thereon and configured to be moveable relative to the cartridge end panel such that during retracting of the cartridge from the cavity, the cartridge floor retracts from beneath the item and relative to the cartridge end panel, whereby the one or more items are discharged from the cartridge into the cavity.

8. The packaging system of claim 7 wherein the packaging system is configured to move a portion of the film from an infeed position to an outfeed position, wherein in the infeed position the rear connection is formed by a fold in the film.

9. The packaging system of claim 8 further comprising first sealing jaws and second sealing jaws for seaming edges of the film walls together to enclose the cavity.

10. The packaging system of claim 8 wherein the infeed position and the outfeed position are vertically aligned such that the film is configured to move vertically downwardly, and the fold is substantially vertical.

11. The packaging system of claim 10 further comprising horizontal jaws adapted for forming a bottom seam while the film is in the infeed position and vertical jaws adapted for sealing front edges of the film sidewalls together, wherein the vertical jaws engage the front edges of the film sidewalls and the horizontal jaws engage the sidewalls to enclose the cavity upon indexing of the film to the outfeed position.

12. The packaging system of claim 8 wherein the infeed position and the outfeed position are horizontally aligned such that the film is configured to move horizontally, and the fold is substantially horizontal.

13. The packaging system of claim 12 further comprising horizontal outlet jaws adapted for seaming leading edges of the film together while the film is in the infeed position and horizontal front jaws adapted for sealing front edges of the film sidewalls together while the film is in the outfeed position, wherein the outlet jaws engage trailing edges of the film sidewalls and the jaws engage the sidewalls to enclose the cavity after indexing of the film to the outfeed position.

14. The packaging system of claim 8 further comprising an arm configured to insert and retract the cartridge relative to the cavity, the arm including a first actuator coupled to at least the cartridge floor and a second actuator coupled to at least the cartridge end panel, wherein the first and second actuators are configured such that (i) each one of the first and second actuators extend to insert the cartridge into the cavity, then (ii) the first actuator retracts at least the cartridge floor while the second actuator is at least partially extended such that at least the floor retracts relative to the cartridge end panel, thereby discharging the at least one item into the cavity, and then (iii) the second actuator retracts to fully retract the cartridge end panel from the cavity.

15. The packaging system of claim 14 wherein the arm is detachable such that after the one or more items are discharged from a first cartridge, the arm detaches from the first cartridge and then attaches to and picks up a second cartridge to insert it into another cavity.

16. A cartridge system for inducting one or more items, comprising:

a cartridge including at least one sidewall, a bottom wall, and an end panel; the cartridge bottom wall being configured to be moveable relative to the cartridge end panel during retracting of the cartridge from a cavity, the bottom wall being adapted for having an item rest thereon; and an arm configured to insert and retract the cartridge relative to a cavity of a package, the arm including a first actuator coupled to at least the cartridge bottom wall and a second actuator coupled to at least the cartridge end panel, wherein the first and second actuators are configured such that (i) each one of the first and second actuators extend to insert the cartridge into the cavity, then (ii) the first actuator retracts at least the cartridge bottom wall while the second actuator is extended such that the cartridge end panel remains substantially stationary, thereby removing the bottom wall from beneath the item and discharging the at least one item into the cavity, and then (iii) the second actuator retracts to retract the cartridge end panel from the cavity.

17. The cartridge system of claim 16 wherein the arm is detachable such that after the one or more items are discharged from a first cartridge, the arm detaches from the first cartridge and then attaches to and picks up a second cartridge to insert it into another cavity.

18. The cartridge system of claim 16 wherein the system is configured such that for a least a portion of a time period while at least the bottom wall is being retracted, the cartridge end panel is stationary in space.

19. The cartridge system of claim 16 wherein the system is configured such that for a least a portion of a time period while at least the bottom wall is being retracted relative to the cartridge end panel, the cartridge end panel is moving in space.

20. The cartridge system of claim 16 wherein the at least one cartridge sidewall is a pair of opposing cartridge sidewalls that are affixed to the cartridge bottom wall, such that the cartridge sidewalls and the cartridge bottom wall are adapted to retract together relative to the end panel, whereby the one or more items are discharged from the cartridge into the cavity.

* * * * *